Dec. 17, 1929.  H. C. KOGELSCHATZ  1,740,099
RIM TOOL
Filed Sept. 30, 1927

WITNESSES

INVENTOR.
HENRY CHARLES KOGELSCHATZ
BY
ATTORNEY.

Patented Dec. 17, 1929

1,740,099

UNITED STATES PATENT OFFICE

HENRY CHARLES KOGELSCHATZ, OF OKLAHOMA CITY, OKLAHOMA, ASSIGNOR TO GEORGE A. CROFT, OF FAIRFIELD, NEBRASKA

RIM TOOL

Application filed September 30, 1927. Serial No. 223,106.

This invention relates to improvements in tire rim tools and more particularly to a tool for breaking or contracting, and likewise expanding, tire rims, to permit of the removal and replacement of tires.

One of the objects of the present invention is to provide a tire rim tool which may be conveniently adapted to a rim of the split type and readily manipulated to effect breaking of the rim, and the invention contemplates the provision of a tool of this type so constructed that, after the rim has been initially contracted or broken, the tool may be adjusted so as to maintain the rim in its contracted condition while the tire is being removed therefrom or placed thereon, the tool being so constructed that when arranged in the manner stated, it will lock with the rim in a manner to maintain it in the adjusted position thus obviating the necessity of manually holding it in said position, and enabling the user to employ both hands in removing or replacing the tire.

Another object of the invention is to provide a tire rim tool of the class described so constructed that it may be employed not only while breaking or contracting rims but also in expanding rims after tires have been fitted thereto.

Another object of the invention is to so construct the tool that the same may be folded to compact form, when not required for use, and conveniently stored in the ordinary tool box, occupying, in this condition, a minimum amount of space.

Another object of the invention is to provide a tire tool of the class described so constructed that a standard size of the tool may be employed upon rims of various sizes.

While the accompanying drawings and the description which is to follow, constitute a disclosure of the preferred embodiment of the invention, it will be understood that various changes may be made within the scope of what is claimed.

Figure 1:
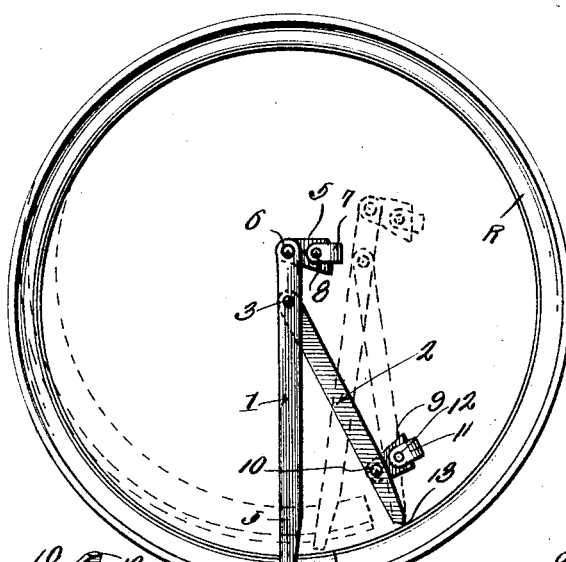
Figure 1 is a view in side elevation of the tire tool embodying the invention, the view illustrating, in full lines, the manner in which the tool is initially applied to the rim and, in dotted lines, the position to which the tool is adjusted in initially contracting the rim.

The tool embodying the invention comprises a pair of arms, one indicated in general by the numeral 1 and the other by the numeral 2, the arms being preferably formed from heavy bar metal and the arm 2 being pivotally connected as at 3, to the arm 1 near one end of the said arm. The arm 1 at its other end is curved laterally and preferably slightly tapered so as to provide a rim flange engaging hook indicated by the numeral 4. An approximately triangular plate 5 is pivoted as at 6 to the other end of the arm 1 at that side thereof at which the hook 4 projects, the pivot 6 for the plate 5 being located near one corner of the said plate. A hook 7 is pivoted as at 8 to the plate 5, the pivoted portion of the hook being located preferably at that side of plate 5 at which the end of the arm 1 is located, and the bill of the hook projecting beyond the opposite side of the said plate 5 and the said hook extending beneath that edge of the plate adjacent which it is pivoted.

Figure 3:
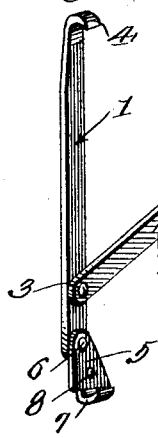
Fig. 3 is a perspective view of the tool.
Figure 4:
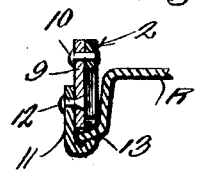
Fig. 4 is a vertical transverse sectional view, in detail, taken substantially on the line 4—4 of Figure 2, looking in the direction indicated by the arrows.

A plate 9 corresponding substantially to the plate 5 is pivoted as indicated by the numeral 10, to the arm 2 near the outer end thereof, and at that side of the said arm which corresponds to the side of the arm 1 upon which the plate 5 is mounted. A hook 11 corresponding to the hook 7 is pivoted as at 12 to the plate 9 at the side of the said plate corresponding to that side of the plate 5 to which the hook 7 is pivoted, the hooks 7 and 11 being presented in the same direction as is shown in drawing, and particularly Figure 3 thereof. The outer end of the arm 2 is tapered to a point which is indicated by the numeral 13 and which constitutes a spur for coaction with the rim to be contracted and expanded, in the manner which will presently be described.

In the use of the tool, the same is initially positioned as shown in full lines in Figure 1, when it is desired to employ the tool in contracting a split rim, the rim being indicated by the reference letter R. In this position of adjustment of the tool, the hook 4 of the arm 1 is engaged with the flange of the rim R adjacent the split in the rim, and the spur 13 at the outer end of the arm 2 is engaged against the inner side of the rim at the other side of the split in the rim and adjacent to said split. The tool may then be employed in the manner of a lever, by exerting pressure, towards the right, against the upper end of the arm 1. At this time, the arm 2 constitutes a fulcrum and the arm 1 a lever, and as pressure is applied in the manner stated, the spur end of the arm 2 will rock upon the inner side of the rim R, and the parts will be brought to substantially the position shown in dotted lines in the said Figure 1, the end of the rim which is engaged by the hook 4 of the arm 1 being drawn inwardly, thus contracting the rim and disposing the said end thereof inwardly of and slightly spaced from the other end of the rim as clearly shown in dotted lines in said figure. The tool may then be disengaged from the rim, and inasmuch as the rim is broken, or contracted, its end which has been previously engaged and displaced by the hook 4 of the arm 1, will assume a position overlapping the other end of the rim. The hook 11 of the tool is now engaged with the displaced end of the rim by engaging the hook with the flange of the rim and with the edge of the plate 9, beyond which the hook projects, engaging against the inner side of said flange, the pointed end 13 of the arm 2, at such time, substantially engaging against the inner side of the flange. The hook 7 is then engaged with the flange of the rim and also the edge of the plate 5 beyond which the said hook projects, as clearly shown in Figure 2, and the arm 1 is then swung towards the right in said figure, exerting a pull upon the arm 2, and moving about the pivot 6 as a fulcrum, the hook 4 at the outer end of the arm 1 being finally engaged with the flange of the rim. With the tool thus arranged, and adjusted, the rim R will be held in its contracted condition, and therefore the tire which is upon the rim may be removed, and, likewise, a tire may be placed upon the rim.

Figure 2:
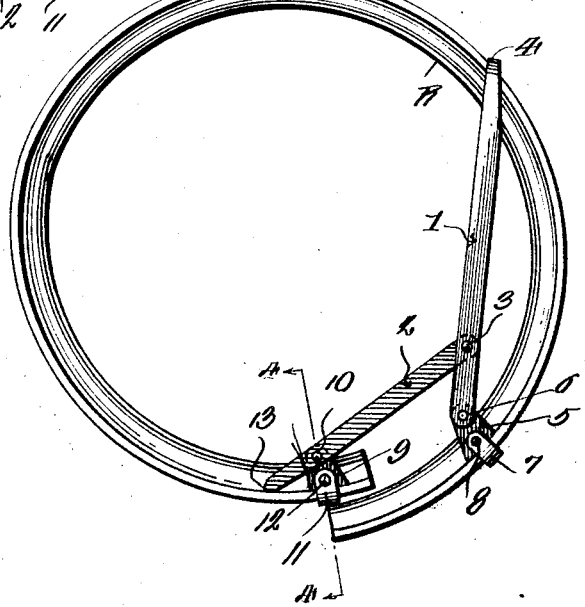
Fig. 2 is a similar view illustrating the manner in which the tool is adapted to the rim, after the rim has been broken, as shown in dotted lines in Figure 1, for the purpose of holding the rim in contracted condition.
Figure 5:
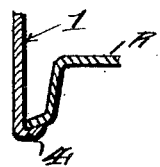
Fig. 5 is a detail transverse sectional view taken substantially on the line 5—5 of Figure 1.

After a tire has been seated upon the contracted rim, the tool is removed and is reversed with respect to the position shown in Figure 1, the arms 1 and 2 being suitably adjusted about the pivot 3, from the figure shown in Figure 2, so that the spur 13 at the outer end of the arm 2 will engage against the inner side of the rim at the inwardly sprung end thereof, the hook 4 at the outer end of the arm 1 being engaged with the flange of the rim at the other side of the split and adjacent thereto. The tool may then be adjusted, by exerting pressure against the upper end of the arm 1, as in the manner previously explained in connection with Figure 1 of the drawing and in the initial contraction of the rim R, whereupon the spur 13 will have biting engagement with the inner side of the rim R and the end of the rim, engaged by the spur, will be moved outwardly both circumferentially and radially, so as to bring it into alinement or registration with the other end of the rim, thus restoring the rim, by expansion, to its original form.

From the foregoing description of the invention it will be evident that the tool embodying the invention may be readily and quickly adapted to a split rim and manipulated so as to contract the rim, then adjusted to maintain the rim in contracted condition, while a change of tires is effected, and finally adapted to the rim and manipulated so as to expand the rim or restore the same to its original form. It will likewise be evident that the parts of the tool are so constructed and arranged that, when the tool is not in use, the arms 1 and 2 may be folded so as to overlie each other in longitudinal registration. It will be evident also that the plates 5 and 9 do not in any way interfere with folding of the arms 1 and 2 nor with pivotal adjustment of the arms to different relative positions, in the use of the tool, inasmuch as the arm 2 is of a length somewhat less than the distance between the pivot 3 and the hook 4, and the plates 5 and 9 are mounted upon the sides of the respective arms 1 and 2 which are opposite the sides of the arms which are in contact when the arms are folded.

It will be understood that due to the fact that the hooks 7 and 11 are pivotally mounted upon the plates 5 and 9 respectively, which plates are in turn pivotally mounted upon the arms 1 and 2 respectively, a wide range of angular adjustment of the hooks 7 and 11 is provided for and consequently the tool may be adapted to tire rims of various diameters and the hooks engaged with the rims at various points spaced with relation to the split in the rim, without in any way interfering with the proper functioning of the tool.

Having thus described my invention what I claim as new is:—

A rim tool comprising a relatively long arm, a fixed rim engaging hook at one end of the arm, a rim engaging hook pivotally connected with the other end of said arm, a relatively short arm pivotally connected with the first mentioned arm adjacent the end carrying the pivoted hook and having a fulcrum point for engagement with the inner face of a rim near and at one side of the split therein, when the first mentioned hook is engaged with the flange of the rim near the split and on the other side thereof from the fulcrum point, whereby upon swinging movement of the arms, on the fulcrum point the rim will be broken, a rim-engaging hook pivotally mounted upon the second mentioned arm near the fulcrum point and engageable with the inner split end of a rim after the same is broken and at the outer side of the flange thereof and against the inner side of which the fulcrum point is engageable, the pivoted hook of the first mentioned arm engaging the flange of the rim on the other side of the split in the rim from the pivoted hook carried by the second mentioned arm, the first mentioned arm constituting a lever for swinging movement about the pivot of its rim engaging hook to exert a pull upon the second mentioned arm to contract the rim, the fixed hook on the first mentioned arm being engageable with the outer side of the rim flange when said first mentioned arm has been swung to a position to contract the rim and thereby hold the rim in its contracted position.

In testimony whereof I affix my signature.

HENRY CHARLES KOGELSCHATZ.